United States Patent
Kinter et al.

(10) Patent No.: US 7,509,456 B2
(45) Date of Patent: *Mar. 24, 2009

(54) APPARATUS AND METHOD FOR DISCOVERING A SCRATCH PAD MEMORY CONFIGURATION

(75) Inventors: Ryan C. Kinter, Sunnyvale, CA (US);
Scott M. McCoy, Palo Alto, CA (US);
Gideon D. Intrater, Sunnyvale, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 562 days.

This patent is subject to a terminal disclaimer.

(21) Appl. No.: 11/003,120

(22) Filed: Dec. 3, 2004

(65) Prior Publication Data
US 2005/0102483 A1    May 12, 2005

Related U.S. Application Data

(63) Continuation of application No. 10/278,537, filed on Oct. 22, 2002, now Pat. No. 6,836,833.

(51) Int. Cl.
*G06F 12/00* (2006.01)
(52) U.S. Cl. ..................................................... 711/118
(58) Field of Classification Search ........................ None
See application file for complete search history.

(56) References Cited

U.S. PATENT DOCUMENTS

| | | | |
|---|---|---|---|
| 5,307,477 A | 4/1994 | Taylor et al. |
| 5,542,062 A | 7/1996 | Taylor et al. |
| 5,572,704 A | 11/1996 | Bratt et al. |
| 5,604,909 A | 2/1997 | Joshi et al. |
| 5,632,025 A | 5/1997 | Bratt et al. |
| 5,699,551 A | 12/1997 | Taylor et al. |
| 5,954,815 A | 9/1999 | Joshi et al. |
| 5,966,734 A | 10/1999 | Mohamed et al. |
| 6,247,124 B1 | 6/2001 | Joshi et al. |
| 6,430,655 B1 | 8/2002 | Courtright et al. |
| 6,505,285 B1 | 1/2003 | Rabinovici et al. |
| 6,546,477 B1 | 4/2003 | Russo et al. |
| 6,557,127 B1 | 4/2003 | Adams et al. |
| 6,691,221 B2 | 2/2004 | Joshi et al. |

OTHER PUBLICATIONS

Kandemir et al, "Dynamic Management of Scratch-Pad Memory Space," © 2001 ACM, p. 690-695.
Panda et al, "Data Memory Organization and Optimizations in Application-Specific Systems," © IEEE, p. 56-68.
Kandemir et al., "Exploiting Shared Scratch Pad Memory Space in Embedded Multiprocessor Systems," © 2002 ACM, p. 219-224.
Kandemir et al, "Exploiting Shared Scratch Pad Memory Using Presburger Formulas," © 2001 ACM, p. 7-12.
Panda el al., "Efficient Utilization of Scratch-Pad Memory in Embedded Processor Applications," © 1997, IEEE,p. 7-11.
Banakar et al, "Scratchpad Memory: A Design Alternative for Cache On-chip Memory in Embedded Systems," © 2002 ACM, p. 73-78.

*Primary Examiner*—Brian R Peugh
(74) *Attorney, Agent, or Firm*—Cooley Godward Krosnish LLP

(57) ABSTRACT

The invention includes a method of debugging an embedded processor. Scratch pad memory of an embedded processor is accessed to form a configuration file characterizing the configuration of scratch pad regions of the scratch pad memory. The embedded processor is debugged using information from the configuration file. The invention also includes an embedded processor with a processor core and scratch pad memory connected to the processor core. The scratch pad memory includes a set of scratch pad regions. The scratch pad memory stores values characterizing base addresses and region size values of the set of scratch pad regions.

16 Claims, 4 Drawing Sheets

APPARATUS AND METHOD FOR DISCOVERING A SCRATCH PAD MEMORY CONFIGURATION

CROSS REFERENCE TO RELATED APPLICATIONS

This application is a continuation application of U.S. patent application Ser. No. 10/278,537, entitled, "Apparatus and Method for Discovering a Scratch Pad Memory Configuration," filed on Oct. 22, 2002, issued as U.S. Pat. No. 6,838,833, the contents of which are hereby incorporated by reference in their entirety.

BRIEF DESCRIPTION OF THE INVENTION

This invention relates generally to embedded processors. More particularly, this invention relates to a technique for identifying a scratch pad memory configuration associated with an embedded processor.

BACKGROUND OF THE INVENTION

An embedded processor is an electronic control and computation device incorporated into an engineered system, such as a camera, game console, printer, personal digital assistant, and the like. An embedded processor has a processor core and an associated memory. The associated memory commonly includes a scratch pad memory, which is a general-purpose random access memory region for the processor core. The patent application entitled "Scratch Pad RAM with Cache-Like Access Times", Ser. No. 09/494,488, filed Jan. 31, 2000, and assigned to the assignee of the present invention, describes a technique for accessing scratch pad memory. The contents of the application are incorporated herein. The memory associated with a processor core may also include an instruction cache, a data cache, main memory and I/O devices.

The processor core realizes a number of benefits by using the scratch pad memory instead of the data cache. For example, stores to the scratch pad memory are not written to main memory. For local data, this reduces the bus bandwidth associated with store traffic. Advantageously, a scratch pad data array can be relatively large compared to a cache way. In addition, a full tag array is not needed for scratch pad memory. The equivalent tag functionality is normally replaced by a simple decode of the physical address to determine hit or miss.

Embedded processors are highly customized devices. While a processor core may be common to many embedded processors, other components associated with the processor core, such as scratch pad memory, typically have unique configurations. These unique configurations lead to problems in debugging embedded processor systems.

There are commercially available tools to debug embedded systems. A limitation associated with these tools is that they require information on the configuration of the embedded processor. Thus, a configuration file must be supplied to the tool. The problem with this approach is that someone must generate a configuration file and the tool vendor must support the configuration file. This requires additional work by the system designer and the tool vendor. In addition, the system designer and the tool vendor need to coordinate their work to insure interoperability.

In view of the foregoing, it would be highly desirable to provide an automated technique for identifying a scratch pad memory configuration. The technique should operate through general interrogation of an embedded processor and provide scratch pad configuration information that is readily usable by a debugging tool.

SUMMARY OF THE INVENTION

The invention includes an embedded processor with a processor core and scratch pad memory connected to the processor core. The scratch pad memory includes a set of scratch pad regions. The scratch pad memory stores values characterizing base addresses and region sizes of the set of scratch pad regions.

The invention also includes a processor probe. The processor probe has input/output circuitry and control logic connected to the input/output circuitry. A scratch pad configuration query module is connected to the control logic. The scratch pad configuration query module is configured to initiate, in conjunction with the control logic and the input/output circuitry, access to a scratch pad memory of an embedded processor. The scratch pad memory includes a set of scratch pad regions. The scratch pad configuration query module initiates a read of values characterizing addresses and region sizes for scratch pad regions of the set of scratch pad regions.

The invention also includes a host computer with input/output circuitry operative to interface with an embedded processor. A central processing unit is connected to the input/output circuitry. A memory is connected to the central processing unit. The memory stores a scratch pad configuration query module configured to initiate, in conjunction with the central processing unit and the input/output circuitry, access to a scratch pad memory associated with the embedded processor. The scratch pad memory includes a set of scratch pad regions. The scratch pad configuration query module initiates a read of values characterizing addresses and region sizes for scratch pad regions of the set of scratch pad regions.

The invention further includes a computer readable medium with a scratch pad configuration query module with executable instructions to initiate access to an embedded processor with a scratch pad memory including a set of scratch pad regions. The scratch pad configuration query module initiates a read of values characterizing addresses and region sizes for scratch pad regions of the set of scratch pad regions.

Another aspect of the invention is a method of debugging an embedded processor. Scratch pad memory of an embedded processor is accessed to form a configuration file characterizing the configuration of scratch pad regions of the scratch pad memory. The embedded processor is debugged using information from the configuration file.

The invention provides an automated mechanism for identifying the location and size of an arbitrary number of regions within a scratch pad memory. The invention utilizes a general interrogation technique to provide scratch pad configuration information that can be used by the debugging tool. Advantageously, the invention allows the debugging tool access to the scratch pad without modification to the debugging tool and without modification to the communications protocol between the debugging tool and a processor probe, such as an EJTAG probe.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
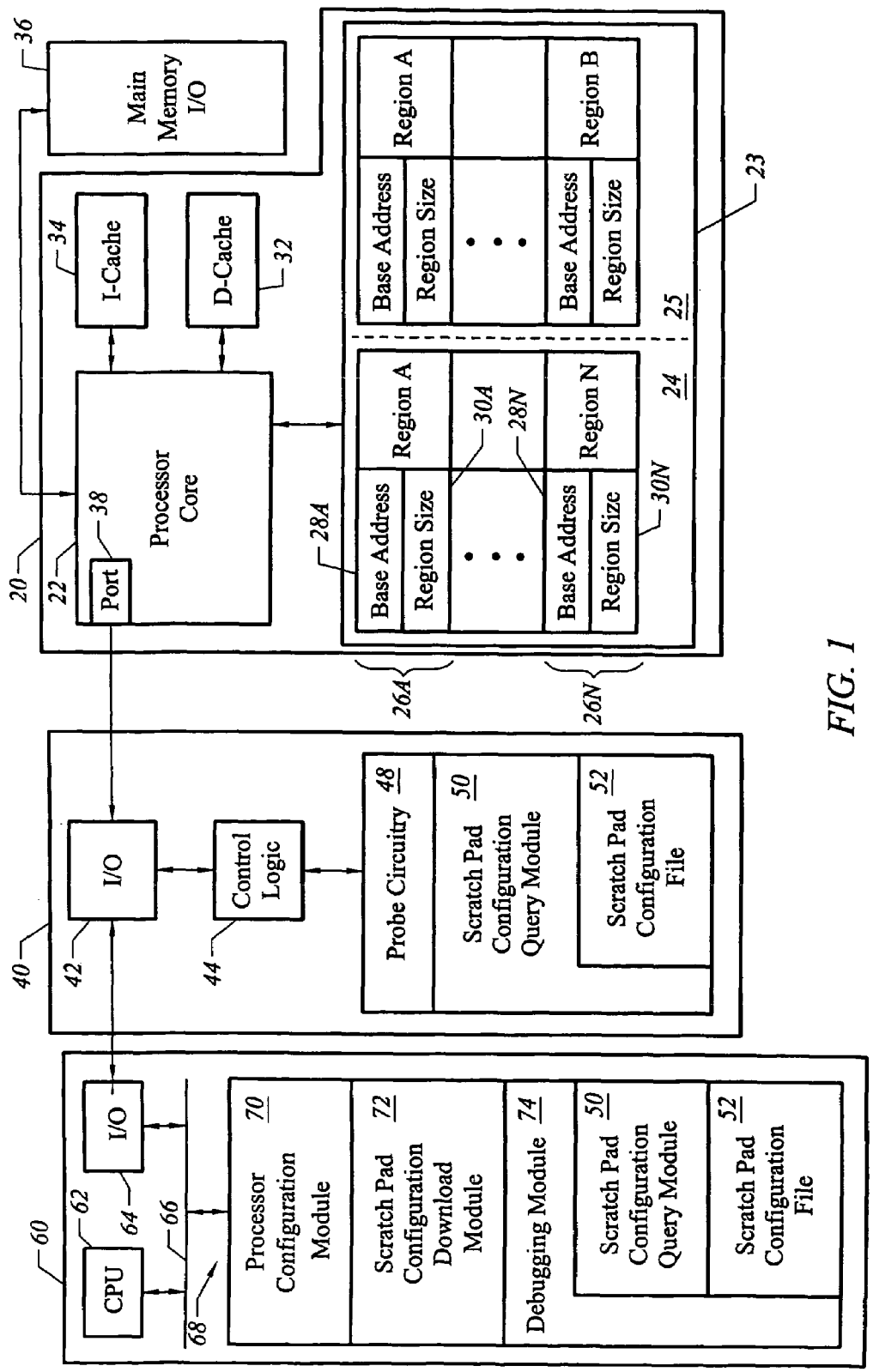
FIG. 1 illustrates an embedded processor, processor probe, and host computer implemented in accordance with an embodiment of the invention.

FIG. 1 illustrates an embedded processor 20 configured in accordance with an embodiment of the invention. The embedded processor 20 includes a processor core 22. The embedded processor 22 is in communication with a scratch pad memory 23. In one embodiment, the scratch pad memory 23 includes an instruction scratch pad 24 and a data scratch pad 25. The instruction scratch pad 24 and the data scratch pad 25 of the scratch pad memory 23 each include a set of scratch pad regions 26A-26N.

The scratch pad regions are configurable by a customer that purchases a processor core 22. That is, when purchasing or licensing a processor core design for an embedded system, various scratch pad configurations can be defined, depending upon the application. In accordance with the invention, configuration of the scratch pad is made visible to debugging software or another application by loading a base address 28 and region size 30 for each scratch pad region 26. Thus, FIG. 1 illustrates base address 28A and region size 30A for a first region 26A and base address 28N and region size 30N for an Nth region 26N. The data scratch pad 25 may include a similar configuration. The base address and region size values constitute downloaded scratch pad configuration information. The downloading, reading, and utilization of this scratch pad configuration information is discussed below.

The processor core 22 accesses a data cache 32, an instruction cache 34, and main memory and I/O 36 using standard techniques. The processor core 22 includes a port 38 for communication with devices external to the embedded processor 20. By way of example, the port 38 may be a Joint Test Access Group (JTAG) port, an EJTAG port, or the like.

A processor probe 40 is connected to the port 38. The processor probe 40 may include prior art processor probe components, such as input/output circuitry 42, control logic 44, and probe circuitry 48. In accordance with the invention, the processor probe 40 is modified to incorporate a scratch pad configuration query module 50. The scratch pad configuration query module 50 may be in the form of software instructions executed by the control logic 44. Alternately, the scratch pad configuration query module 50 may be implemented in a programmable logic device, an application specific integrated circuit, and the like. Regardless of the implementation, the scratch pad configuration query module 50 operates to read the base address 28 and region size 30 of each region 26 of the scratch pad 23. This information is then used to form a scratch pad configuration file 52.

The advantage of this embodiment of the invention is that the scratch pad configuration information is generated independently of the host computer 60 and therefore the host computer 60 can operate as a generic platform that does not require special software or hardware to obtain scratch pad configuration information. This embodiment also allows a host computer to access a scratch pad memory without any information on the scratch pad configuration. In this embodiment, the probe 40 detects whether the address is in the scratch pad and handles the request accordingly, without the host computer knowing or caring whether scratch pad memory is being accessed.

FIG. 1 also illustrates a host computer 60. The host computer 60 includes standard components, such as a central processing unit 62, input/output devices 64, a system bus 66, and a memory 68. In one embodiment, the host computer 60 includes a processor configuration module 70. The processor configuration module 70 is a software module that allows a user to specify the parameters associated with an embedded processor 20. Thus, for example, the processor configuration module 70 may be used to specify the configuration of the scratch pad 23.

The memory 68 also stores a scratch pad configuration download module 72. As implied by its name, the scratch pad configuration download module includes a set of executable instructions to download scratch pad configuration information from the host computer 60, through the processor probe 40, through port 38 of the processor core 22, and into the scratch pad 23. As shown in FIG. 1, the downloaded information includes a base address 28 and a region size 30 for each scratch pad region 26.

Typically, the scratch pad configuration download module 72 will run on a computer that is different than the computer running the processor configuration module 70, but the two modules are shown running on the same machine for the purpose of simplification. The scratch pad configuration download module 72 may be executed from a host computer immediately after physical fabrication of an embedded processor. Alternately, the scratch pad configuration download module 72 may be executed in connection with other initialization and configuration operations performed in connection with an embedded processor. In many instances, the base address and region size values will already be embedded in the scratch pad 23 as a result of the process of forming the embedded processor 20. In these instances, the download module 72 is not used.

The host computer 60 also stores a debugging module 74. The debugging module 74 may be a standard debugging tool for embedded processors. However, the debugging module 74 is supplemented to include a scratch pad configuration query module 50, which produces a scratch pad configuration file 52. As discussed in connection with the processor probe 40, the scratch pad configuration query module 50 operates to read the base address 28 and region size 30 of each region 26 of the scratch pad 23. This information is then used to form the scratch pad configuration file 52. The scratch pad configuration file 52 is utilized by the debugging module 74 during debugging operations, as discussed below.

The debugging module 74 may operate on a host computer separate from the host computer running the scratch pad configuration download module 72 and the processor configuration module 70, even though these modules are shown on a single machine in FIG. 1 for the purpose of illustration. Observe that by coupling a standard debugging module 74 with the scratch pad configuration query module 50 of the invention, standard debugging software can be used to debug the scratch pad of an embedded processor without prior knowledge of the scratch pad configuration. That is, the vendor of the debugging software need not generate or support configuration information for a variety of embedded processors prior to a debugging operation. Similarly, the vendor of the embedded processor need not produce, support, or deliver a separate configuration file to a vendor of debugging software. Instead, the scratch pad configuration query module 50 produces the scratch pad configuration file 52 when the debugging module 74 requires it.

FIG. 1 introduces various components and operations associated with the invention. For example, FIG. 1 illustrates a new type of embedded processor 20. In particular, the figure illustrates an embedded processor 20 that includes a scratch pad 23 that stores scratch pad configuration information. In the disclosed embodiment, the scratch pad configuration information is in the form of a base address and region size for each scratch pad region. Other arrangements of configuration data, such as a start address and an end address for a region, may also be used in accordance with the invention. This configuration information may be read using the scratch pad configuration query module of the processor probe or by using the scratch pad configuration query module of the host computer. In either embodiment, a scratch pad configuration file is produced for utilization by a debugging module.

Figure 2:
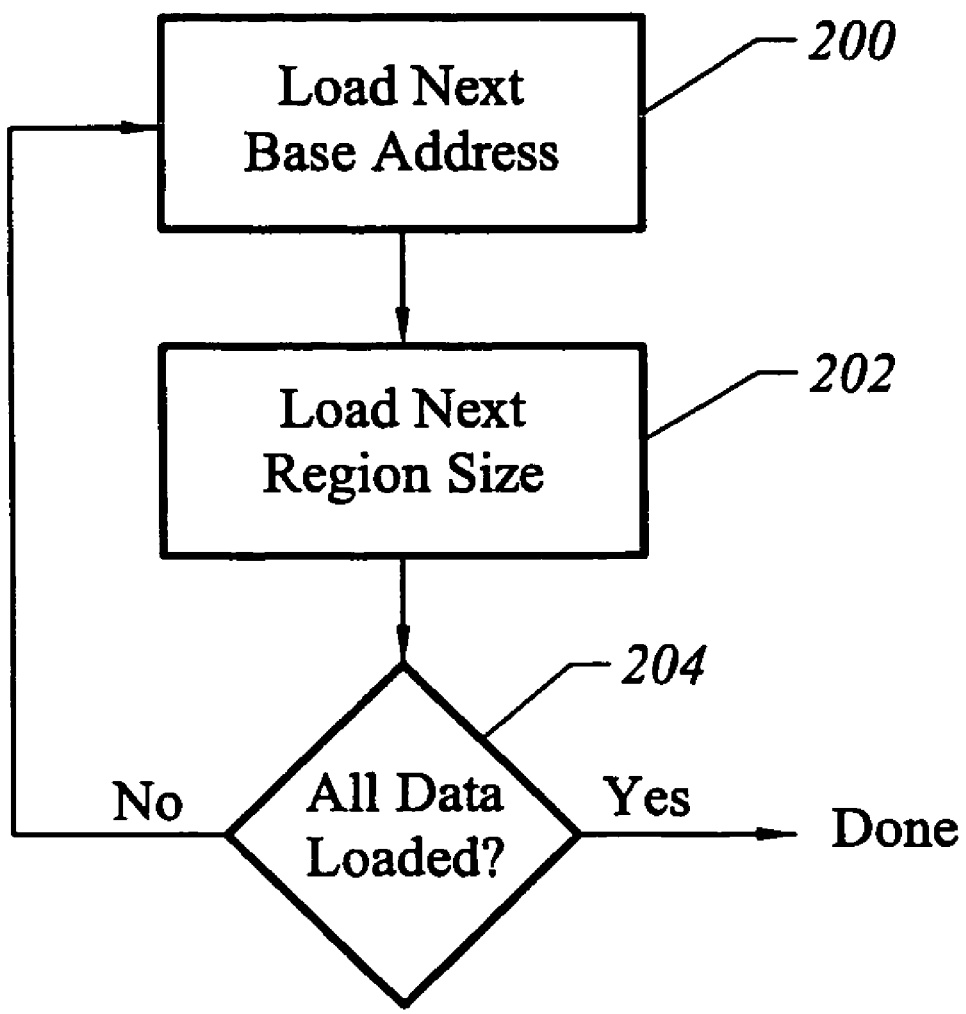
FIG. 2 illustrates processing steps associated with a scratch pad configuration download module configured in accordance with an embodiment of the invention.

FIG. 2 illustrates processing operations associated with a scratch pad configuration download module 72 of the invention. As previously indicated, the embedded processor 20 may be formed with embedded base addresses and region sizes for the scratch pad regions. An additional feature of the invention is to download this information through a software controlled process. When this additional feature is used, the initial processing step is to load a base address into a scratch pad region (block 200). The base address specifies the location of the beginning of a scratch pad region. A region size is then loaded into the scratch pad region (block 202). The region size specifies the size of the scratch pad region from the beginning address. Thus, this information defines the size and boundaries of a particular scratch pad region. At block 204 a decision is made to determine whether all of the data is loaded. If not (block 204—No), the next base address is loaded (block 200) and the next region size is loaded (block 202). The next base address may be loaded from the tag associated with the first physical location of the next scratch pad region. Alternately, the first 2N tag locations of the scratch pad can be used to provide information about the N scratch pad regions. After all of this data is downloaded, the process is complete (block 204—Yes).

Figure 3:
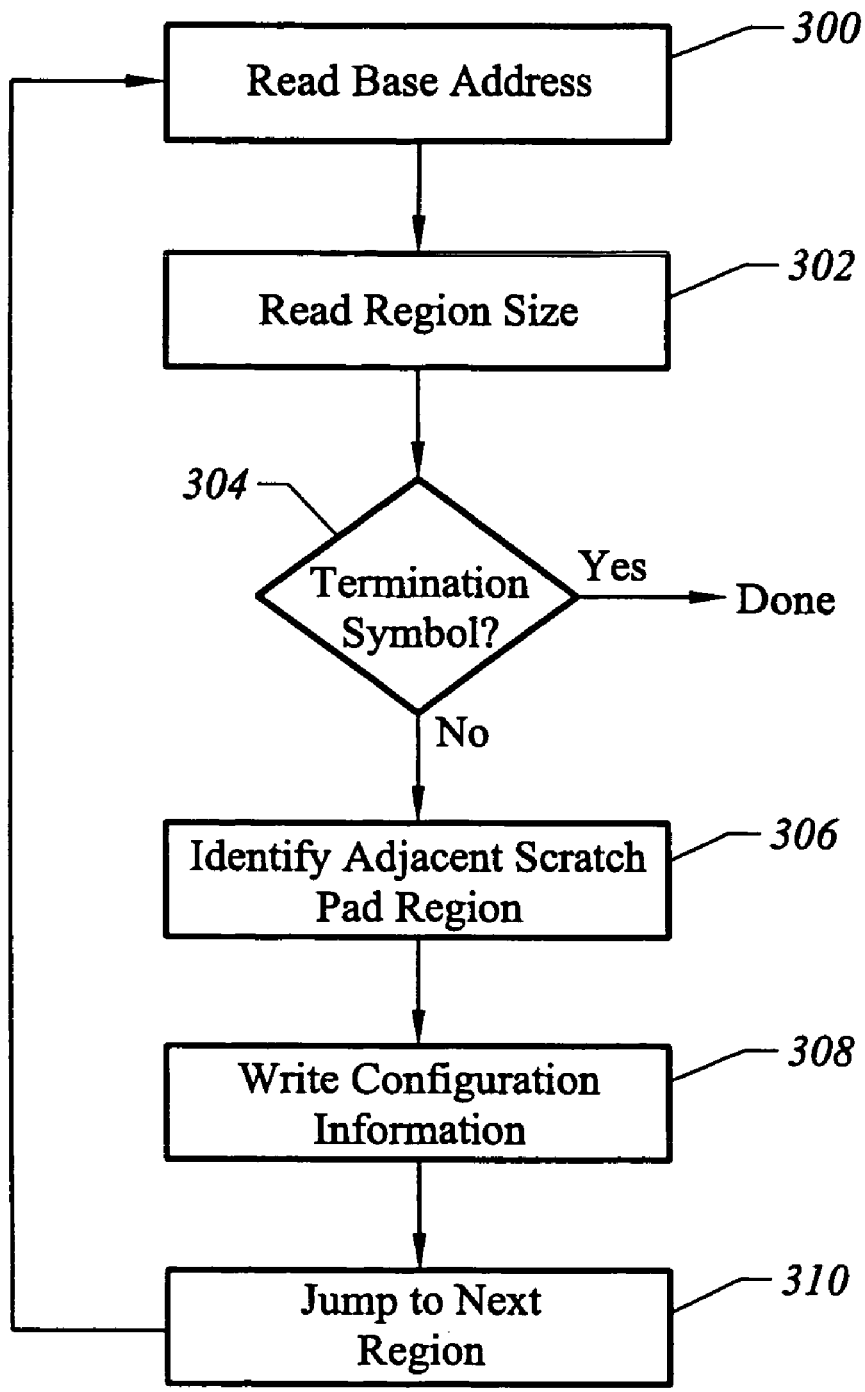
FIG. 3 illustrates processing steps associated with a scratch pad configuration query module configured in accordance with an embodiment of the invention.

FIG. 3 illustrates processing operations associated with a scratch pad configuration query module 50 of the invention. As previously indicated, this module may be in the processor probe 40 or the host computer 60. The first operation associated with this module is to read a base address (block 300). The operation of reading the base address may also be used to identify whether a scratch pad region is enabled. Thus, for example, a single bit can be set to convey this information.

The next operation of FIG. 3 is to read the scratch pad region size (block 302). If the scratch pad region size is not a termination symbol (block 304—No), the location of the next adjacent scratch pad region is identified (block 306). In particular, the scratch pad region size is the offset to the next scratch pad region. This configuration information is then written to a configuration file (block 308) and access control jumps to the next scratch pad region (block 310), resulting in the processing of block 300. This process is repeated until a termination symbol is identified (block 304—Yes); at which point the configuration information is available. The termination symbol may be in the form of a pre-determined special character (e.g., 0), a size and base address that is equal to the size and base address of a previous region, or a size and base address that is equivalent to the size and base address of the initial region.

Figure 4:
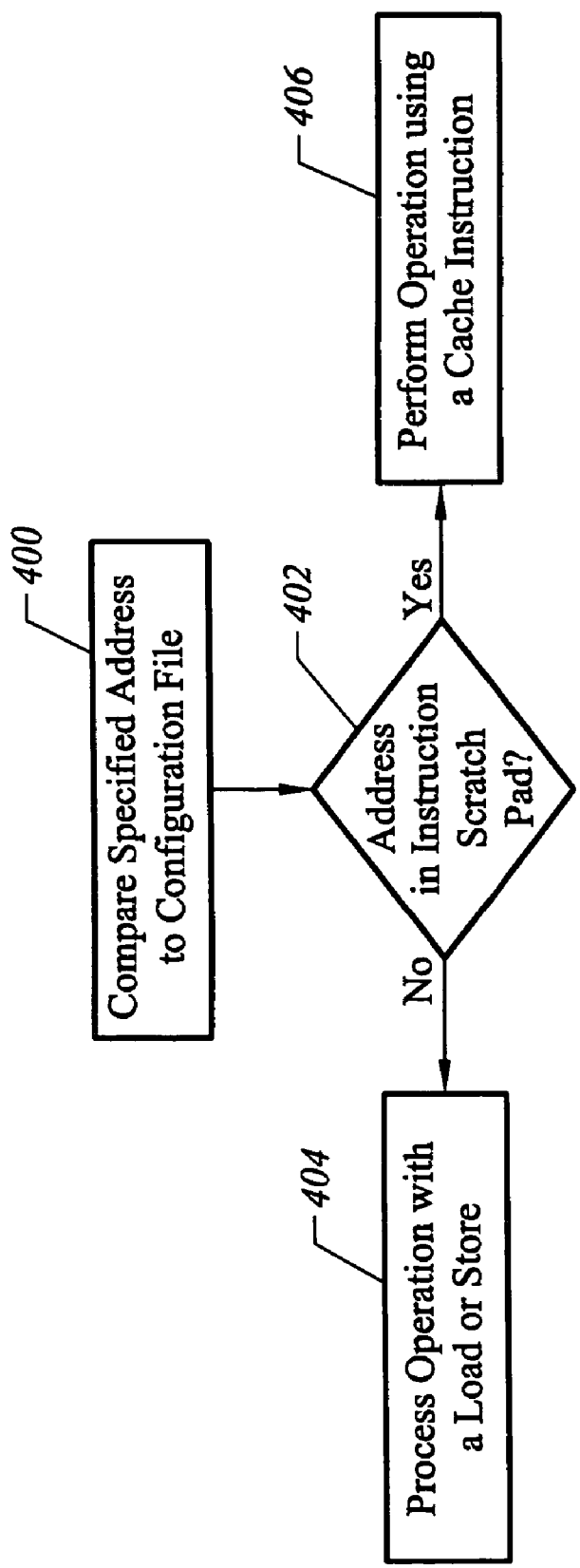
FIG. 4 illustrates processing steps associated with a debugging module configured in accordance with an embodiment of the invention.

FIG. 4 illustrates an embodiment of operations performed by a debugging module 74. In particular, the figure illustrates how the debugging module 74 performs debugging operations utilizing the scratch pad configuration file 52. The debugging operations are performed by reading or writing to a memory location. The scratch pad configuration file 52 may also be resident in the processor probe 40, in which case the processor probe 40 performs the operations of FIG. 4.

As shown in FIG. 4, a specified address is compared to the configuration file (block 400). As indicated, the configuration file characterizes the size and locations of the scratch pad memory. Thus, this information can be used to determine whether the specified address is in the instruction scratch pad memory (block 402). If the specified address is not in the instruction scratch pad memory (block 402—No), then the specified operation is implemented using a standard load or store operation. On the other hand, if the specified address is in the instruction scratch pad memory (block 402—Yes), the specified operation is implemented using a cache instruction. Typically, a cache instruction is required to modify the contents of the instruction scratch pad memory.

Scratch pad memory is not designed to support the reading of configuration information. Thus, a mechanism must be devised to read this information. An example technique is to use an Index Load Tag cache instruction. In an embodiment of the invention, each tag is associated with a scratch pad random access memory line (e.g., one scratch pad random access memory line has the same size as a cache line). The base address and size information may be returned in the physical address portion of a TagHi/TagLo signal. Other bits in the tag can be used for application specific information (e.g., enable, un-cached support, and the like).

The invention has been implemented in connection with the MIPS32 4K Processor Core Family, sold by MIPS Technologies, Inc., Mountain View, Calif. In this embodiment, the scratch pad memory is a static random access memory (SRAM). Interface signals to the scratch pad memory include a Tag Read Strobe (TagRdStr) signal and a Tag Read Data (TagRdData) signal, which may be used to read the configuration data. Similarly, a Tag Write Stobe (TagWrStr) signal and a Tag Write Data (TagWrData) signal may be used to download configuration data. Observe then that the tag ports, not data ports, are used in this embodiment of the invention. Since tag ports are not used in connection with the scratch pad memory, these ports can be exploited for writing and reading configuration information in accordance with the invention. Alternately, a data region of the scratch pad memory may be reserved for configuration information.

In addition to implementations of the invention using hardware, the invention can be embodied in a computer usable (e.g., readable) medium configured to store a computer readable code (e.g., computer readable program code, data, etc.). The code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL) and so on; or other programming and/or circuit (i.e., schematic) capture tools available in the art.

The computer code can be disposed in any known computer usable (e.g., readable) medium including semiconductor memory, magnetic disk, optical disk, (e.g., CD-ROM, DVD-ROM, and the like).

It is understood that the invention can be embodied in computer code (e.g., as part of an IP (intellectual property) core, such as a microprocessor core, or a system-level design, such as a System on Chip (SOC)) and transformed to hardware as part of the production of integrated circuits. Also, the invention may be embodied as a combination of hardware and computer code.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An embedded processor, comprising:
   a processor core; and
   a scratch pad memory connected to said processor core, said scratch pad memory including a scratch pad region, wherein said scratch pad memory stores a value characterizing said scratch pad region.

2. The embedded processor of claim 1 wherein said processor core processes said value to facilitate interaction with said scratch pad memory.

3. The embedded processor of claim 1 further comprising an instruction cache and a data cache connected to said processor core.

4. A processor probe, comprising:
   input/output circuitry;
   control logic connected to said input/output circuitry; and
   a scratch pad configuration query module connected to said control logic, said scratch pad configuration query module configured to initiate, in conjunction with said control logic and said input/output circuitry, access to a scratch pad memory of an embedded processor, said scratch pad memory including a scratch pad region, said scratch pad configuration query module initiating a read of a value within said scratch pad region characterizing said scratch pad region.

5. The processor probe of claim 4 wherein said scratch pad configuration query module processes said value to facilitate interaction with said scratch pad memory.

6. The processor probe of claim 5 wherein said scratch pad configuration query module processes said value to form a scratch pad configuration file.

7. A host computer, comprising:
   input/output circuitry operative to interface with an embedded processor;
   a central processing unit connected to said input/output circuitry; and
   a memory connected to said central processing unit, said memory storing a scratch pad configuration query module configured to initiate, in conjunction with said central processing unit and said input/output circuitry, access to a scratch pad memory associated with said embedded processor, said scratch pad memory including a scratch pad region, said scratch pad configuration query module initiating a read of a value within said scratch pad region characterizing said scratch pad region.

8. The host computer of claim 7 wherein said input/output circuitry includes internal input/output circuitry and external probe processor circuitry.

9. The host computer of claim 7 wherein said scratch pad configuration query module processes said value to facilitate interaction with said scratch pad memory.

10. The host computer of claim 9 wherein said scratch pad configuration query module processes said value to form a scratch pad configuration file.

11. A computer readable medium, comprising:
    a scratch pad configuration query module with executable instructions to initiate access to an embedded processor with a scratch pad memory including a scratch pad region, said scratch pad configuration query module initiating a read of a value within said scratch pad region characterizing said scratch pad region.

12. The computer readable medium of claim 11 wherein said scratch pad configuration query module includes executable instructions to process said value to facilitate interaction with said scratch pad memory.

13. The computer readable medium of claim 12 wherein said scratch pad configuration query module includes executable instructions to process said value to form a scratch pad configuration file.

14. The computer readable medium of claim 11, further comprising:
    a scratch pad configuration download module with executable instructions to transfer into said embedded processor values characterizing said scratch pad region.

15. A method of debugging an embedded processor, comprising:
    accessing scratch pad memory of an embedded processor to retrieve a value within said scratch pad memory to form a configuration file characterizing the configuration of a scratch pad region of said scratch pad memory; and
    debugging said embedded processor using information from said configuration file.

16. A computer readable medium, comprising:
    first computer readable program code for describing a processor core; and
    second computer readable program code for describing a scratch pad memory coupled to said processor core, said scratch pad memory including a scratch pad region, wherein said scratch pad memory is operable to store a value characterizing said scratch pad region.

* * * * *

UNITED STATES PATENT AND TRADEMARK OFFICE
CERTIFICATE OF CORRECTION

PATENT NO. : 7,509,456 B2  Page 1 of 1
APPLICATION NO. : 11/003120
DATED : March 24, 2009
INVENTOR(S) : Ryan C. Kinter, Scott M. McCoy and Gideon D. Intrater It is certified that error appears in the above-identified patent and that said Letters Patent is hereby corrected as shown below:

Claim 16, line 7, please delete "wherein said scratch pad memory is operable to store a" and insert -- wherein said scratch pad memory stores a --

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,509,456 B2                                     Page 1 of 1
APPLICATION NO.   : 11/003120
DATED             : March 24, 2009
INVENTOR(S)       : Ryan C. Kinter, Scott M. McCoy and Gideon D. Intrater It is certified that error appears in the above-identified patent and that said Letters Patent is hereby corrected as shown below:

Column 8, Claim 16, line 55, please delete "wherein said scratch pad memory is operable to store a" and insert -- wherein said scratch pad memory stores a --

This certificate supersedes the Certificate of Correction issued June 2, 2009.

Signed and Sealed this

Twenty-third Day of June, 2009

JOHN DOLL
*Acting Director of the United States Patent and Trademark Office*